(12) United States Patent
Deivasigamani et al.

(10) Patent No.: US 11,973,463 B1
(45) Date of Patent: Apr. 30, 2024

(54) PHOTOVOLTAIC THERMAL COLLECTOR ADAPTOR

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 0 days.

(21) Appl. No.: 18/119,344

(22) Filed: Mar. 9, 2023

(51) Int. Cl.
| | |
|---|---|
| *F24S 10/50* | (2018.01) |
| *H02S 10/20* | (2014.01) |
| *H02S 40/34* | (2014.01) |
| *F24D 17/00* | (2022.01) |
| *F24D 17/02* | (2006.01) |
| *F24D 19/10* | (2006.01) |

(52) U.S. Cl.
CPC .............. *H02S 40/34* (2014.12); *F24S 10/50* (2018.05); *H02S 10/20* (2014.12); *F24D 17/0021* (2013.01); *F24D 17/0068* (2013.01); *F24D 17/02* (2013.01); *F24D 19/106* (2013.01); *F24D 19/1063* (2013.01); *F24D 2200/02* (2013.01); *Y02E 10/50* (2013.01)

(58) Field of Classification Search
CPC .......... H02S 40/34; H02S 10/20; F24S 10/50; F24D 17/0021; F24D 17/0068; F24D 17/02; F24D 19/106; F24D 19/1063; F24D 2200/02; Y02E 10/50
See application file for complete search history.

(56) References Cited

U.S. PATENT DOCUMENTS

| | | | |
|---|---|---|---|
| 2011/0094498 A1* | 4/2011 | Newman ................. | F24S 40/60 126/585 |
| 2013/0019614 A1* | 1/2013 | Campbell .......... | H05K 7/20209 62/62 |
| 2013/0319634 A1* | 12/2013 | Sheppard ................ | F28F 27/02 165/96 |
| 2020/0274483 A1* | 8/2020 | Sanglap .................. | H02S 40/34 |
| 2022/0136711 A1* | 5/2022 | Leckinger ........... | F24D 19/1063 62/235.1 |

* cited by examiner

*Primary Examiner* — Michael Y Sun
(74) *Attorney, Agent, or Firm* — Jong Patent Firm; Cheng Ning Jong; Tracy P. Jong

(57) ABSTRACT

An adaptor for adapting a solar electric generator and solar heater to a thermal storage device, the adaptor including a first port, a second port, a third port, a fourth port and a pump configured for receiving a fluid through the third port and pulling the fluid through the third port from a thermal storage device to the fourth port, wherein the first port and the fourth port are configured to be supplied on a first surface and the second port and third port are configured to be supplied on a second surface.

17 Claims, 5 Drawing Sheets

PHOTOVOLTAIC THERMAL COLLECTOR ADAPTOR

BACKGROUND OF THE INVENTION

1. The Field of the Invention

The present invention relates to a photovoltaic thermal (PVT) collector adaptor. More specifically, the present invention is directed to a PVT collector adaptor for functionally connecting a PVT collector to a thermal battery or for functionally connecting a PVT collector to a thermal battery and a heat source.

2. Background Art

Although solar heating technologies have existed for many years, drawbacks to conventional solar heating systems have hampered wide scale adoption of the technology. For example, due to their inefficiencies in interconnections of solar heaters to thermal batteries, conventional solar heating systems require custom connecting solutions which indirectly require significant levels of knowledge and understanding on the part of the end users or even professional installers of solar heating systems in order to assemble a solar heating system, especially a solar heating system involving electricity and thermal storage devices. This necessitates the determination of appropriate interconnections required of solar heaters and photovoltaic cells and thermal batteries and additionally one or more power sources required to make the solar heaters and thermal batteries a functional system. Additionally, the use of complex, custom designed components in many conventional solutions requires complicated interconnections between fluid transmitting parts, increasing the initial manufacturing and installation costs, as well as long term maintenance costs if components for interconnections have not been sourced properly. Another drawback to conventional systems is that consumers or even installers who are required to source photovoltaic thermal (PVT) collector systems for consumers are often deterred by the impact of the unsightly and disorganized assortment of fluid conductors, electrical harnesses and other cooperating devices have on the aesthetics of their properties on which the PVT collector systems are installed. Further, mistakes caused by poor training in the installations of such systems and the complicated interconnections between components of such systems can mean resulting systems which do not perform to their full potential and resulting systems which do not operate altogether.

It would be advantageous to provide an adaptor suitable for connecting a photovoltaic thermal collector to a thermal battery to form a functional solar thermal heating system or an adaptor suitable for connecting a solar heater and a photovoltaic collector to a thermal battery and an electric battery to form a solar thermal heating system that can also receive thermal energy one or more additional heat sources.

SUMMARY OF THE INVENTION

In accordance with the present invention, there is provided an adaptor for adapting a first system and a second system to a third system, the adaptor including:
  (a) a first port;
  (b) a second port;
  (c) a third port;
  (d) a fourth port; and
  (e) a pump configured for receiving a fluid through the third port and pulling the fluid through the third port from a third system to the fourth port, wherein the first port and the fourth port are configured to be supplied on a first surface and the second port and third port are configured to be supplied on a second surface.

In one embodiment, the first system is a solar electric generator, the second system is a solar heater and the third system is a thermal storage device. In one embodiment, at least one of the second port and the third port is configured for a quick connection or disconnection with the third system. In one embodiment, at least one of the second port and the third port includes a groove disposed about a periphery of the at least one of the second port and the third port and a seal disposed within the groove. In one embodiment, the seal includes an O-ring. In one embodiment, the adaptor further includes an electrical receptacle for receiving an electrical connection from the first system. In one embodiment, the adaptor further includes an electric storage device configured to receive and store electrical charge from the first system. In one embodiment, the adaptor further includes a controller configured to control the pump. In one embodiment, the adaptor further includes a hook configured for interfacing with a latch disposed on an enclosure of the third system such that a portion of the weight of the adaptor is supported on the enclosure while the second port and the third port are fluidly coupled with the third system. In one embodiment, the adaptor further includes a fifth port fluidly connected to the first port, wherein the fifth port is configured to be a bleed port. In one embodiment, the adaptor further includes a sixth port fluidly connected to the fourth port, wherein the fifth port and the sixth port are configured to be fluidly connected to a heat source. In one embodiment, the positioning of at least one of the second port and the third port relative to the second surface is configured to be adjustable. In one embodiment, at least a portion of a fluid conductor connecting the first port and the second port is a flexible fluid conductor. In one embodiment, at least a portion of a fluid conductor connecting the third port and the fourth port is a flexible fluid conductor. In one embodiment, the first surface is a surface disposed in a plane different from the second surface. In one embodiment, an inlet of the pump is configured to be disposed at a level substantially the same as the level at which the third port is disposed and the third port is disposed at a level lower than the second port.

An object of the present invention is to provide an adaptor suitable to functionally connect a photovoltaic thermal collector and a thermal battery.

Another object of the present invention is to provide an adaptor that is uncomplicated and suitable to functionally connect a photovoltaic thermal collector and a thermal battery.

Another object of the present invention is to provide an adaptor suitable to not only functionally connect a solar heater to a thermal battery but also functionally connect a solar electric generator to an electric battery.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

2—adaptor
4—port
6—port
8—port
10—port
12—pump
14—conductor
16—conductor
18—thermal storage device or battery
20—port
22—port
24—working fluid
26—vent
28—photovoltaic thermal collector
30—fastener
32—conductor
33—conductor
34—connector
36—connector
38—surface
40—surface
42—seal, e.g., O-ring seal
44—electrical connector
46—electrical receptacle
48—circuit breaker
50—controller
52—electricity storage device, e.g., electric battery
54—electric grid
56—inverter
58—power supply
60—hook
62—latch
64—heater, e.g., heat pump
66—heater, e.g., resistive heater
68—enclosure
70—slot
72—solar charge controller
74—auxiliary input port
76—port for receiving heated flow from heat source
78—port for allowing spent flow to heat source
80—input power port to heater
82—stand-off
84—output power port
86—heat exchanger

PARTICULAR ADVANTAGES OF THE INVENTION

The present adaptor allows a suitable photovoltaic thermal collector to be functionally connected to a thermal battery without requiring modifications to be made to any part of the photovoltaic thermal collector and the thermal battery and electric battery if it is utilized. The present adaptor simplifies connections between a photovoltaic thermal collector and a thermal battery, removing or reducing the need for a trained installer for installation of a photovoltaic thermal (PVT) system. In one embodiment, a present adaptor further simplifies connections between a photovoltaic thermal collector with an electrical grid, allowing surplus electricity to be supplied to the electrical grid from the photovoltaic thermal collector.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
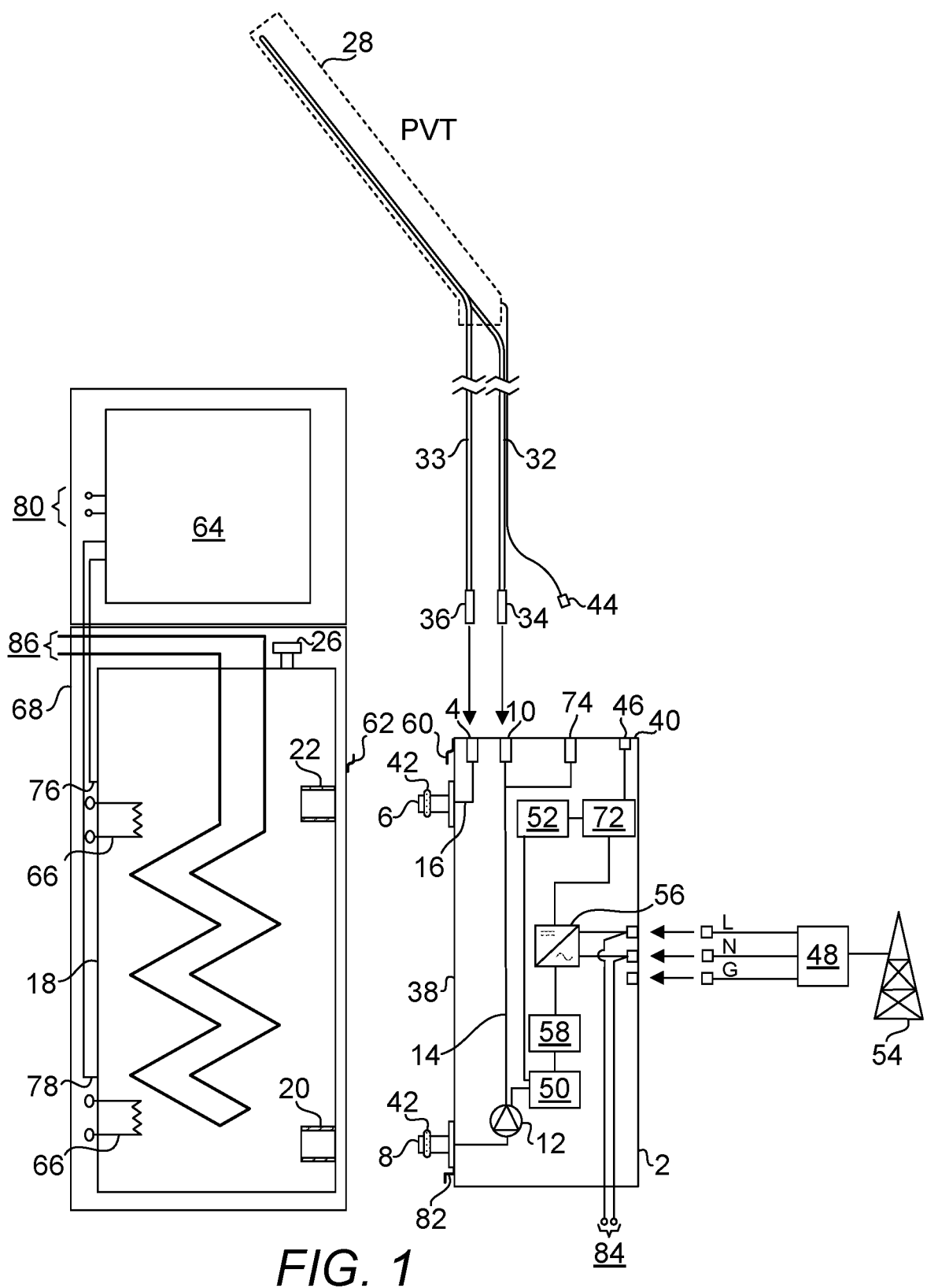
FIG. 1 is a diagram depicting one embodiment of a present adaptor configured to connect a photovoltaic thermal collector to a thermal battery.

FIG. 1 is a diagram depicting one embodiment of a present adaptor 2 configured to connect a photovoltaic thermal or PVT collector or a combined solar electric generator and a solar heater to a thermal battery. The adaptor 2 is useful for adapting a photovoltaic thermal collector 28 for heating a working fluid stored in a thermal storage device 18. The adaptor 2 is essentially a body including interfaces such as a first port 4, a second port 6 fluidly connected to the first port 4, a third port 8 and a fourth port 10 fluidly connected to the third port 8 and a pump 12 configured for receiving a fluid through the third port 8 and pulling the fluid through the third port 8 from a thermal storage device 18 to the fourth port 10. The first port 4 and the fourth port 10 are configured to be supplied on a first surface 38 and the second port 6 and third port 8 are configured to be supplied on a second surface 40 of the body. The first surface 38 is preferably a surface disposed in a different plane from the second surface 40 as the first surface 38, upon the installation of adaptor, will no longer be accessible. With a present adaptor 2, a technician or installer of the PVT heating system needs only to ensure that ports on one surface are connected to fluid conductors of the solar heater and ports on the other surface are inserted into ports disposed on one side of the thermal battery, removing any guesswork on the part of the technician or installer and installation mistakes that can cause a drop in efficiency of the operations of the heating system and also mistakes that can also prevent optimal operations of the heating system can be avoided. The body can be a block having a plurality of surfaces including the first surface 38 and second surface 40. No working fluid is shown disposed in the thermal battery 18 of FIG. 1. In the embodiment shown, the adaptor 2 further includes an electrical receptacle 46 for receiving an electrical connection via an electrical connector 44 from the solar electric generator. Therefore, in addition to the fluid connections via the ports 4, 6, 8 and 10, there is provided an electrical connection which facilitates the connection of the solar electric generator with the necessarily equipment in the adaptor that it interfaces with. This further eliminates any guesswork on the part of the installer. In the embodiment shown, the electrical receptacle 46 is electrically connected to a solar charge controller 72 which handles the charging of an electric storage device, e.g., a battery 52. This battery 52 is useful for powering a controller 50 which controls and supplies power to the pump 12 that drives a working fluid 24 through the conductor that connects the third port 8 and the fourth port 10 to the solar heater to be heated before returning through the conductor that connects the first port 4 and the second port 6 into the thermal battery 18. Without an external power source, e.g., power from an electrical grid 54, the PVT can function provided that there is sufficient solar power received by the solar electric generator and solar heater. However, with access to an electrical grid 54 protected by circuit breaker 48, the PVT can be configured to not only transfer sufficient solar power for its own use, but also backfeed surplus electricity generated by the solar electric generator to the electrical grid 54 once the battery 52 it is configured to charge has been fully charged. An inverter 56 is interposed between the solar charge controller 72 and a power supply 58 which alternatively or additionally provides power to the controller 50 and the pump 12. An additional output power port 84 may also be provided to power heater 64, e.g., a heat pump, by connecting port 84 to port 80 of heater 64 to power the compressor of the heat pump. With access to the electrical grid 54, the heating system can be operational even if the battery 52 has been insufficiently charged from which to draw power to power the pump 12 as the power supply 58 which receives its input power from the inverter 56 is capable of supplying not only power to the pump 12 for circulating the working fluid 24 but also any devices operationally connected to it. In one embodiment, the inlet of the pump 12 is configured to be disposed at a level substantially the same, e.g., within about 1-2 inches, as the level at which the third port 8 is disposed or at a level as far below as possible from the second port 6 to afford the pump 12 sufficient or maximum head during operation and as much head as possible for self-priming during the first start-up of the pump 12. It shall be noted that the third port 8 is disposed at a level lower than the second port 6.

In the embodiment shown, each of the second port 6 and the third port 8 is configured for a quick connection or disconnection with the thermal storage device 18. A quick connection or disconnection between two mating ports allows the two mating ports to be coupled to form a leak-free fluid connection or the two mated ports to be disconnected without requiring a significant amount of effort, reducing the amount of effort, time and expense for assembling/installing or dismantling a heating system utilizing such a mechanism. In order to achieve liquid-tight connections while allowing easy insertion of one port in the other, each of the second port 6 and the third port 8 is equipped with a seal about its periphery. In order to retain a seal on each, a groove is disposed about a periphery of each such that a seal 42, e.g., an O-ring can be disposed within the groove and retained therein.

Figure 2:
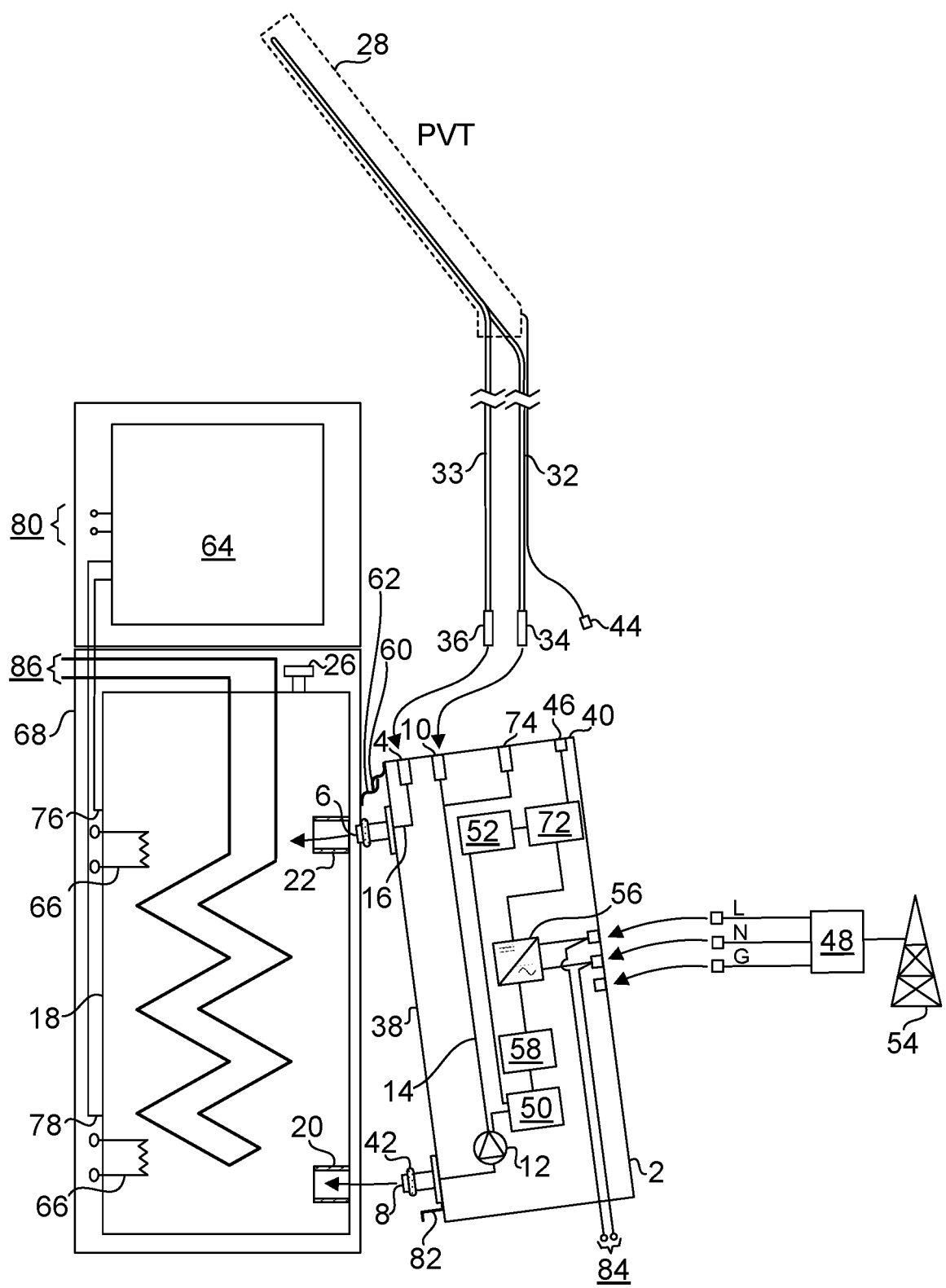
FIG. 2 is a diagram depicting one embodiment of a present adaptor being used to connect a photovoltaic thermal collector to a thermal battery.
Figure 3:
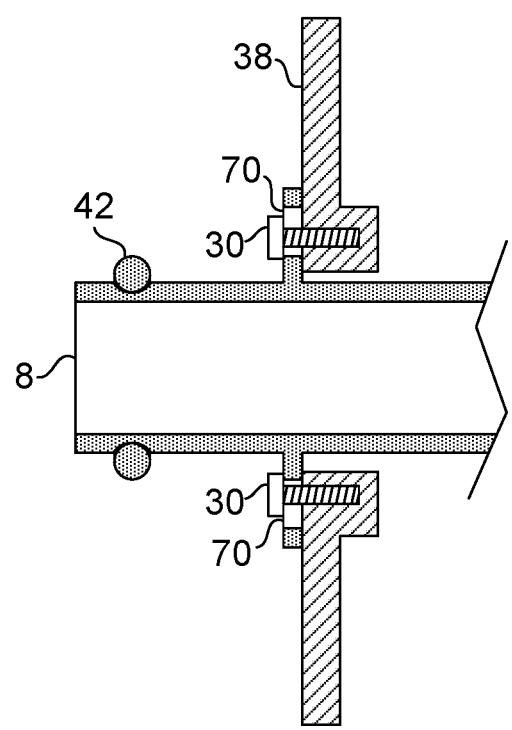
FIG. 3 is a cross-sectional view of the third port depicting one embodiment of an adjustment mechanism which allows the position of the third port to be adjustable relative to the surface upon which the third port is mounted.

FIG. 2 is a diagram depicting one embodiment of a present adaptor 2 being used to connect a PVT collector to a thermal battery. As shown in FIG. 2, the alignment of the second port 6 with respect to receiving port 22 and the third port 8 with respect to receiving port 20 are further facilitated using a hook 60 configured for interfacing with a latch 62 disposed on an enclosure 68 of the thermal storage device 18 such that a portion of the weight of the adaptor 2 is supported on the enclosure 68 while the second port 6 and the third port 8 are fluidly coupled with the thermal storage device 18. Each of the hook and the latch is essentially a part having a cross-sectional profile shown but a part which extends orthogonally from the cross-sectional profile. An installer of the heating system can first focus on hanging the adaptor 2 on the enclosure 68 at roughly the level the adaptor 2 is to be coupled to the thermal storage device 18. As the ports, once connected, interface with a working fluid, e.g., a glycol mixture, care must be taken to ensure that the ports are connected snugly to prevent leakages. The hook-and-latch mechanism affords the installer time to adjust the positioning of at least one of the ports 6, 8 properly. A stand-off 82 is provided substantially on an opposing end of the surface 38 from the hook 60 to ensure that, once seated as shown elsewhere herein, the adaptor 2 no longer has the tendency to rotate to cause dislodgement of the second port 6 from port 22 and any potential rattling that can occur due to contacts of the adaptor 2 and the enclosure 68 caused by wind and vibrations from equipment, e.g., pump 12, can be minimized. The adaptor 2 is preferably further secured at the stand-off 82 to the enclosure 68 using, e.g., one or more fasteners. In one embodiment, the second port 6 is fixedly positioned on surface 38 while the third port 8 is configured to be adjustable. Despite efforts in ensuring precision manufacturing practices have been adhered to, mechanical parts are often still being made with a wide range of tolerances. Heating system parts are no exception. Therefore, it is imperative that for the adaptor 2 to be mateable by way of the thermal battery ports 20, 22, the position of at least one of the second port 6 and third port 8 is adjustable. FIG. 3 is a cross-sectional view of the third port 8 depicting one embodiment of an adjustment mechanism which allows the position of the third port 8 to be adjustable relative to the surface 38 upon which the third port 8 is mounted. Here, the third port 8 includes a flange having a plurality of slots 70, one disposed on each side of the third port 8. These slots 70 allow the port 8 to be slid up and down along surface 38 of the adaptor 2 before the fasteners 30 are tightened to secure the third port 8 in place. In another embodiment, the positioning of the second port 6 is made adjustable instead. In yet another embodiment, the positioning of each of the second port 6 and the third port 8 relative to surface 38 is made adjustable. In one embodiment, at least a portion of a fluid conductor 16 connecting the first port 4 and the second port 6 is a flexible fluid conductor to make positional adjustment of the second port 6 easier. In one embodiment, at least a portion of a fluid conductor 14 connecting the third port 8 and the fourth port 10 is a flexible fluid conductor to make positional adjustment of the fourth port 10 easier.

Figure 4:
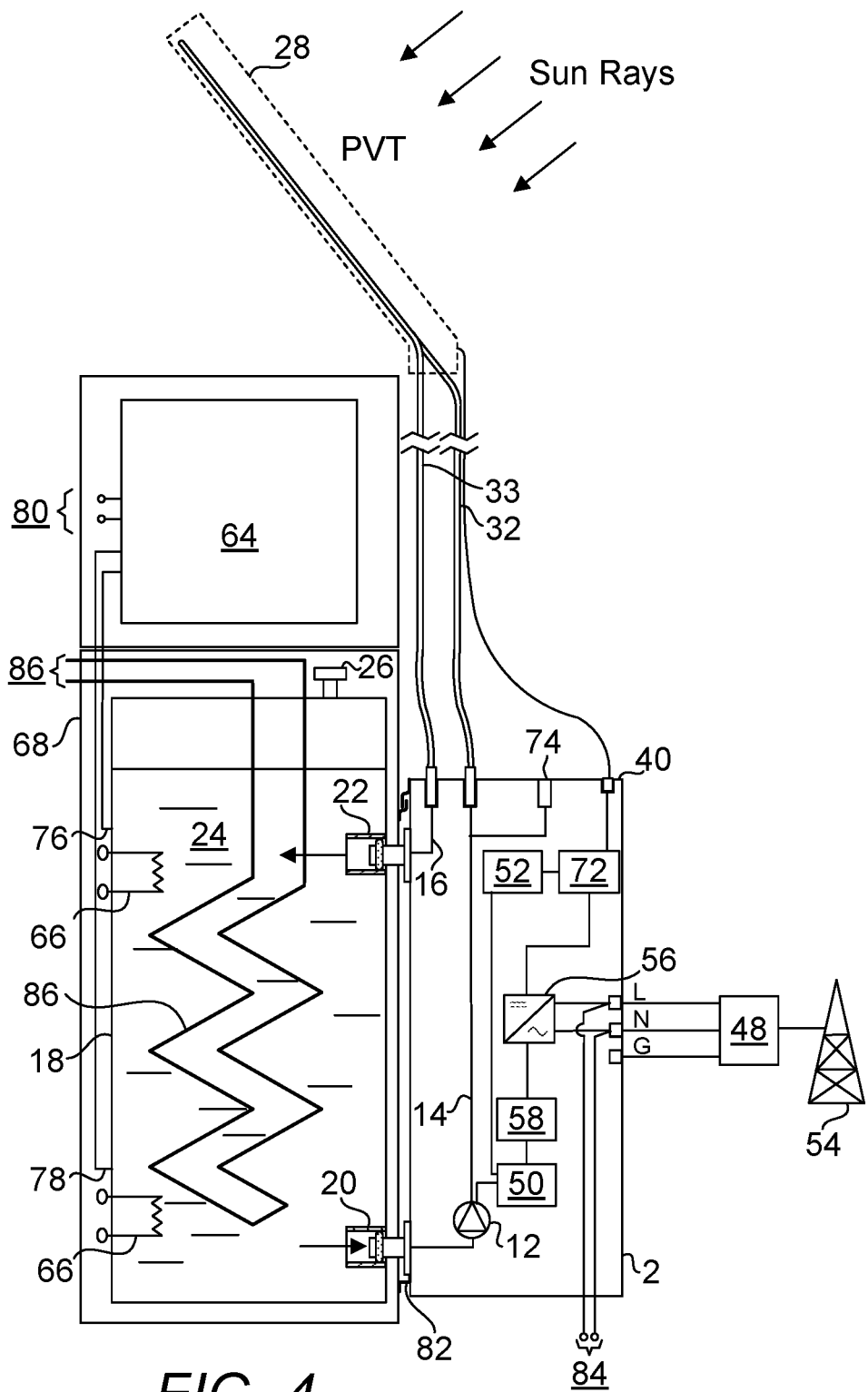
FIG. 4 is a diagram depicting one embodiment of a present adaptor having been used to connect a photovoltaic thermal collector to a thermal battery.

FIG. 4 is a diagram depicting one embodiment of a present adaptor 2 having been used to connect a photovoltaic thermal collector to a thermal battery 18. Heated flow of the solar heater is received by the thermal battery 18 via fluid conductor 33 and connector 36 that is mated with port 4 while spent flow from the thermal battery 18 is sent through connector 34 and fluid conductor 32 back to the solar heater. It shall be noted that the thermal battery 18 is now filled with a working fluid 24, e.g., a glycol mixture, the interior of the thermal battery 18 is vented using a vent 26. In one embodiment, the adaptor 2 further includes a fifth port 74 fluidly connected to the third port 8, the fifth port 74 is configured to be a bleed port to allow the pump 12 to be self-primed at the first start-up upon installation with the working fluid, e.g., a glycol mixture used to fill the thermal battery 18. In one embodiment, once the thermal battery 18 has been deemed operational, the fifth port 74 is capped to prevent evaporation of the contents of the thermal battery 18 through it. The heating system is transported with the thermal battery 18 void of a working fluid 24 to save on transportation costs and other expenses due to the transportation of a liquid which can be constituted onsite. Once the adaptor 2 has been coupled with the thermal battery 18 and the PVT, the pump 12 can be turned on to circulate a working fluid 24 to transport heated working fluid from the solar heater to the thermal battery 18. In one embodiment, this process continues until the controller 50 determines that the thermal battery 18 has been sufficiently thermally charged, at which point the pump 12 is then turned off. Once charged, the thermal battery 18 becomes a heat source to heat a cold water supply requested through heat exchanger, e.g., coil 86. The adaptor 2 can additionally serve as an electrical and/or additionally fluid interface for an additional heater, e.g., a resistive heater 66 and a heat source, e.g., a heat pump 64 circulating the working fluid 24 by emptying heated working fluid through port 76 and drawing spent working fluid 24 through port 78. In the embodiment shown, there is further provided an auxiliary port 76 connected to the fourth port 10. If necessary, both ports 74, 76 can be utilized to add an additional heat source, e.g., another heat pump to increase the rate at which the thermal battery 18 can be charged.

Figure 5:
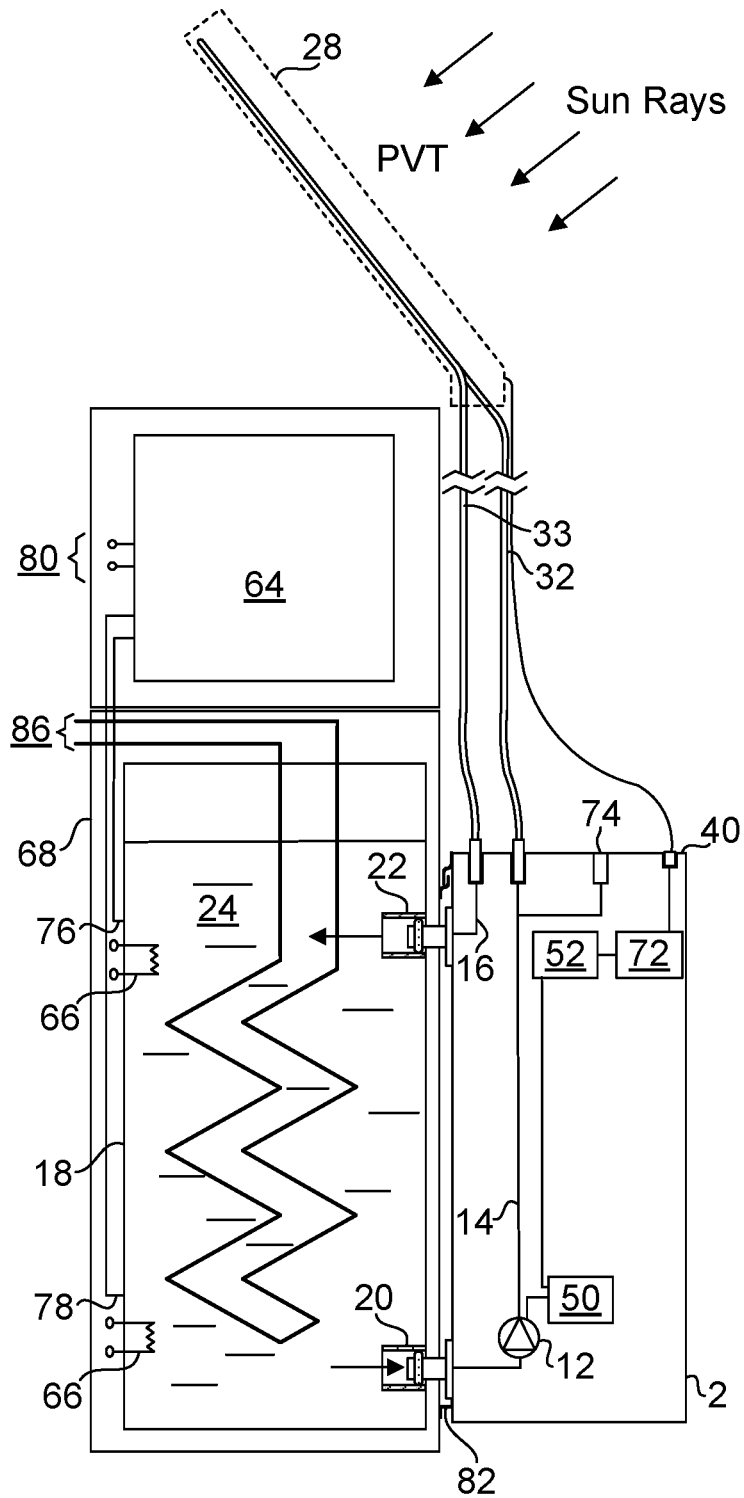
FIG. 5 is a diagram depicting one embodiment of a present adaptor having been used to connect a photovoltaic thermal collector to a thermal battery.

FIG. 5 is a diagram depicting one embodiment of a present adaptor 2 having been used to connect a photovoltaic thermal power generator to a thermal battery 18. Here, the adaptor 2 is suitable for use in locales where no electrical grid 54 is available. Devices required for accessing an electrical grid is absent as electric energy required to power the pump 12 is drawn directly from the solar electric generator. If the battery 52 has become fully charged and the thermal battery 18 has become charged to the desired level, no part of the PVT 28 is able to continue to harvest and store energy in the forms of electrical energy and thermal energy. It can be seen in all the embodiments disclosed herein that the adaptor 2 reduces what would otherwise be a heating system largely unfamiliar to installation technicians of conventional heating systems of other fuels to mating parts and steps that are intuitive to set up a PVT to a thermal battery, reducing the potential for mistakes and increasing the efficiency in setting up the PVT heating system.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed is:

1. An adaptor for adapting a first system and a second system to a third system, said adaptor comprising:
   (a) a first port;
   (b) a second port;
   (c) a third port;
   (d) a fourth port; and
   (e) a pump configured for receiving a fluid through said third port and pulling the fluid through said third port from the third system to said fourth port, wherein said first port and said fourth port are configured to be supplied on a first surface and said second port and third port are configured to be supplied on a second surface and interfaced with the third system.

2. The adaptor of claim 1, wherein said first system is a solar electric generator, said second system is a solar heater and said third system is a thermal storage device.

3. The adaptor of claim 1, wherein at least one of said second port and said third port is configured for a quick connection or disconnection with the third system.

4. The adaptor of claim 3, wherein at least one of said second port and said third port comprises a groove disposed about a periphery of said at least one of said second port and said third port and a seal disposed within said groove.

5. The adaptor of claim 4, wherein said seal comprises an O-ring.

6. The adaptor of claim 1, further comprising an electrical receptacle for receiving an electrical connection from the first system.

7. The adaptor of claim 6, further comprising an electric storage device configured to receive and store electrical charge from the first system.

8. The adaptor of claim 7, further comprising an inverter configured to allow backfeeding of electricity from the electric storage device to an electrical grid through said inverter.

9. The adaptor of claim 1, further comprising a controller configured to control said pump.

10. The adaptor of claim 1, further comprising a hook configured for interfacing with a latch disposed on an enclosure of the third system such that a portion of the weight of the adaptor is supported on the enclosure while said second port and said third port are fluidly coupled with the third system.

11. The adaptor of claim 1, further comprising a fifth port fluidly connected to said first port, wherein said fifth port is configured to be a bleed port.

12. The adaptor of claim 1, further comprising a sixth port fluidly connected to said fourth port, wherein said fifth port and said sixth port are configured to be fluidly connected to a heat source.

13. The adaptor of claim 1, wherein the positioning of at least one of said second port and said third port relative to said second surface is configured to be adjustable.

14. The adaptor of claim 1, wherein at least a portion of a fluid conductor connecting said first port and said second port is a flexible fluid conductor.

15. The adaptor of claim 1, wherein at least a portion of a fluid conductor connecting said third port and said fourth port is a flexible fluid conductor.

16. The adaptor of claim 1, wherein said first surface is disposed in a plane different from said second surface.

17. The adaptor of claim 1, wherein an inlet of said pump is configured to be disposed at a level substantially the same as the level at which said third port is disposed and said third port is disposed at a level lower than the second port.

\* \* \* \* \*